(12) United States Patent
Emmons, Jr.

(10) Patent No.: US 6,275,475 B1
(45) Date of Patent: Aug. 14, 2001

(54) SYSTEM AND METHOD FOR MAINTAINING SPECTRAL CAPACITY IN TIME DIVISION DUPLEX (TDD) SYSTEMS

(75) Inventor: Thomas Peter Emmons, Jr., Mesa, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/094,976

(22) Filed: Jun. 15, 1998

(51) Int. Cl.⁷ ............................... H04B 1/56; H04B 7/00
(52) U.S. Cl. ..................... 370/276; 370/277; 370/293; 370/297; 455/427
(58) Field of Search ............................ 370/276, 277, 370/280, 294, 321, 326, 330, 336, 337, 347, 278, 293, 297; 455/427

(56) References Cited

U.S. PATENT DOCUMENTS

| | | | |
|---|---|---|---|
| 5,668,556 | 9/1997 | Rouffet et al. | 342/354 |
| 5,754,600 | * 5/1998 | Rahnema | 375/341 |
| 6,160,801 | * 12/2000 | Uchida et al. | 370/337 |

\* cited by examiner

Primary Examiner—Wellington Chin
Assistant Examiner—Brenda Pham
(74) Attorney, Agent, or Firm—Harold C. McGurk; Frank J. Bogacz

(57) ABSTRACT

A communications system (100) has at least one TDD platform pair (130, 200) operating synchronously using a Time Division Duplex (TDD) frame structure. A TDD platform pair (130, 200) has first communications platform (124) and second communications platform (126) that are coupled (135) together. First communications platform (124) transmits first data during a first frame and receives second data during a second frame. Second communications platform (126) receives third data during the first frame and transmits fourth data during the second frame. At least one TDDSU (110) receives the first data, transmits the second data, transmits the third data, and receive the fourth data. First communications platform (124) has a first coverage area, and the second communications platform (126) has a second coverage area. A dual coverage area exists where the first coverage region overlaps the second coverage region. At least one TDDSU (110) is located within the dual coverage region.

26 Claims, 3 Drawing Sheets

SYSTEM AND METHOD FOR MAINTAINING SPECTRAL CAPACITY IN TIME DIVISION DUPLEX (TDD) SYSTEMS

FIELD OF THE INVENTION

This invention relates generally to communications systems and, more particularly, to space-based communications systems.

BACKGROUND OF THE INVENTION

Space-based communications systems are being designed and deployed by a number of different organizations. Space-based systems provide unique opportunities and problems because of the space environment. One set of the problems is introduced by the antenna requirements. The antenna problem is particularly important to the design of space-based communication systems. In some cases, large antennas have dominated the design of spacecraft. The antenna problem is also important for airborne communications platforms.

Phased array antennas have been used extensively on-board satellites and aircraft. Phased array antennas can lead to lower operational costs and more payload functionality. Reducing the number of antennas has also been examined by a number of different space-based communication system designers.

Using a single main mission antenna (MMA) that can both transmit and receive could greatly simplify the spacecraft design and lower costs. However, when the uplink and downlink frequency bands are close together, it is difficult to isolate the uplinks and downlinks by filtering and a different technique must be employed.

There is a significant need for a method of operating a communications system that mitigates the isolation requirements on space-based communications platforms within the system. In addition, there is a significant need for a method for using a single antenna on a space-based communications platform while maintaining spectral capacity.

DETAILED DESCRIPTION OF A PREFERRED EMBODIMENT

The present invention provides a method of operating a communications system that mitigates the isolation requirements on space-based communications platforms within the system. In addition, the present invention provides a method for using a single antenna on a space-based communications platform while maintaining spectral capacity.

If a single frequency is used for both transmission and reception, then a time division duplex (TDD) frame structure is required. However even when two frequency bands are available, isolating the input from the output can introduce very significant losses, such as those caused by filters. Using a TDD structure can eliminate or reduce the need for filters.

When the uplink and downlink frequency bands are close together, a time division duplex (TDD) frame structure can be successfully employed. In a system that uses the TDD frame structure, communication devices typically only transmit or receive in a particular time slot. This means that spectral capacity is decreased by at least a factor of two. This invention overcomes this limitation by allowing communication devices to simultaneously transmit and receive in the same time slot. Simulations have demonstrated up to an 80% recovery of spectral capacity.

Allowing a space-based communications platform to operate effectively with a single main mission antenna, decreases the isolation problems and the associated filtering problems. In some cases, filters can be removed reducing the mass of the payload and allowing other functionality to be added.

The present invention allows additional spectrum which can be used to provide additional capacity or provide spatial diversity when there is coverage from two communications platforms. The present invention recovers spectrum that would be otherwise lost using previously used techniques. Spatial diversity from dual communications platform coverage provides considerable gain in that the probability that two communications platforms are blocked is significantly less than the probability associated with a single communications platform. In a high fade environment, the two signals can be added, or the best sub-frame (burst) can be chosen on a sub-frame by sub-frame basis.

Figure 1:
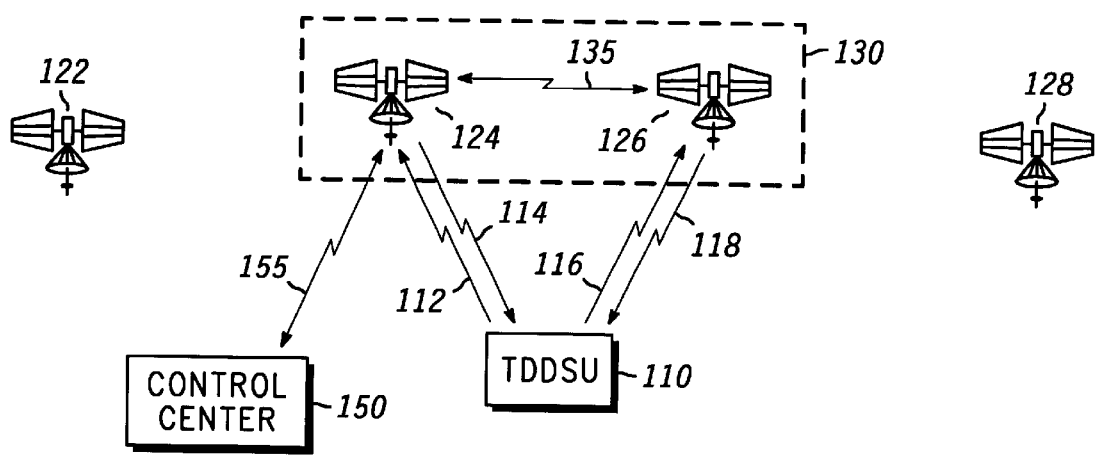
FIG. 1 shows a simplified block diagram of a communications system in accordance with a preferred embodiment of the invention.

FIG. 1 shows a simplified block diagram of a communications system in accordance with a preferred embodiment of the invention. In a preferred embodiment, communications system 100 comprises a plurality of communications platforms 122, 124, 126, and 128; a plurality of Time Division Duplex subscriber units (TDDSU) 110; and at least one control center 150.

In FIG. 1, communications platforms 122, 124, 126, and 128 are illustrated as satellites. This is not intended to be limiting, and those skilled in the art will recognize that other embodiments can be envisioned in which communications platforms 122, 124, 126, and 128 are not satellites.

In a preferred embodiment, communications platforms 122, 124, 126, and 128 are Non-Geosynchronous (Non-GEO) satellites, such as Low Earth Orbit (LEO) satellites. Desirably, communications platforms are located in inclined orbits, which provide large dual coverage regions. In alternate embodiments, communications platforms 122, 124, 126, and 128 can be Geosynchronous (GEO) satellites or combinations of GEO and Non-GEO satellites. In other embodiments, communications platforms 122, 124, 126, and 128 can be air-borne platforms or terrestrial-based mobile or stationary platforms.

TDD platform pair 130 comprises first communications platform 124 and second communications platform 126. In TDD platform pair 130, first communications platform 124 is coupled to second communications platform 126 using crosslink 135. In alternate embodiments, crosslink 135 can include a number of crosslinks such as those illustrated in FIG. 1. In these embodiments, a number of communications platforms can be communicating with each other using a number of crosslinks at a particular time. In other alternate embodiments, gateways (not shown) can be used to establish crosslinks.

In a preferred embodiment, a plurality of first communications platforms are coupled to a plurality of second communications platforms to form a plurality of TDD platform pairs, as illustrated by 130. Desirably, TDD platform pairs are dynamic structures. Communications platforms, such as illustrated by 122, 124, 126, and 128, can be coupled to one another for different lengths of time to form TDD platform pairs. Communications platforms move relative to each other, and TDD platform pairs are formed when communications platforms can communicate with each other. In addition, TDD platform pairs are also coupled to other nearby TDD platform pairs and other communications platforms through crosslinks (not shown). These crosslinks, among other things, form a communications backbone in communications system 100.

Crosslinks 135, among other things, allow communications platforms to operate as TDD platform pairs and to share spectral capacity. In addition, crosslinks 135 provide communications channels for carrying subscriber data and control data to any one of the communications platforms 122, 124, 126, and 128 in communication system 100. By using crosslinks, such as illustrated by crosslinks 135, data from one TDDSU 110 can be routed through one or more TDD platform pairs to other TDDSUs 110 located at other points on the surface of the earth. Alternate embodiments can be envisioned that do not include crosslinks as illustrated in FIG. 1.

Desirably, communications platforms 122, 124, 126, and 128 can also be located at various points on the surface of earth or in the atmosphere above earth. Communications system 100 can accommodate a number of communications platforms 122, 124, 126, and 128. In a preferred embodiment, communications platforms 122, 124, 126, and 128 have been adapted to use TDD frame structures as described below.

A single TDD platform pair 130 is illustrated in FIG. 1 to simplify the illustration and explanation of the invention. This is not intended to be limiting. In addition, a single TDDSU 110 is also illustrated in FIG. 1 to simplify the illustration and explanation of the invention. This is also not intended to be limiting.

In a preferred embodiment, TDDSUs 110 are located at various points on the surface of earth. In alternate embodiments, TDDSUs can be located in the atmosphere above earth. Communications system 100 can accommodate a number of TDDSUs 110. TDDSUs 110 are preferably user terminals capable of transmitting and/or receiving data from TDD platform pairs 130. By way of example, TDDSUs 110 can be located on individual buildings or homes. Moreover, TDDSUs 110 can comprise computers, video devices, and facsimile machines. In a preferred embodiment, TDDSUs 110 have been adapted to use TDD frame structures as described below.

Links 112, 114, 116, and 118 are also illustrated in FIG. 1. Links 112 and 114 represent a communications channel between TDDSU 110 and first communications platform 124. Links 116 and 118 represent a communications channel between TDDSU 110 and second communications platform 126.

In FIG. 1, links 112, 114, 116, and 118 are shown as uni-directional links, and those skilled in the art will recognize that links 112, 114, 116, and 118 can be uni-directional and bi-directional. In a preferred embodiment, links 112, 114, 116, and 118 are radio frequency (RF) links. In alternate embodiments, links 112, 114, 116, and 118 can be RF links and/or optical links.

Desirably, links 112, 114, 116, and 118 encompass a limited portion of the electromagnetic spectrum that is divided into channels. Links 112, 114, 116, and 118 can encompass any suitable channel access scheme such as Frequency Division Multiple Access (FDMA) and/or Time Division Multiple Access (TDMA) and/or Code Division Multiple Access (CDMA) communications channels or combinations thereof.

In a preferred embodiment, the communications channels supported on links 112, 114, 116, and 118 use a combination of TDMA and FDMA to obtain the required channel diversity and system capacity.

In a preferred embodiment, TDDSU 110 communicates with at least one TDD platform pair, such as the one illustrated by communications platforms 124 and 126. Desirably, TDDSU 110 is within a dual coverage area. First communications platform 124 has a first coverage area that is defined by, among other things, the beam pattern for the subscriber link antenna (shown in FIG. 2) on first communications platform 124. Second communications platform 126 has a second coverage area that is defined by, among other things, the beam pattern for the subscriber link antenna (shown in FIG. 2) on second communications platform 126. A dual coverage area is established where the second coverage area overlaps the first coverage area. The channel frequencies are controlled on a frame-by-frame basis within the dual coverage area to provide spatial diversity and to increase system capacity.

In a preferred embodiment, control center 150 communicates with communications platforms 122, 124, 126, and 128 which are within its field of view through links, such as illustrated by 155, which can be RF and/or optical links. A link, such as illustrated by link 155, can be established between any communications platform, such as those illustrated by communications platforms 122, 124, 126, and 128, and control center 150 which are within communication range of each other. Typically, links are established within a limited field of view with respect to control center 150. For example, a field of view can be defined by an antenna's tracking range.

Control center 150 is used, among other things, to monitor and control communications platform operations within communications system 100. Control center 150 can be, for example, a control facility or a switching gateway facility. For example, a control facility can perform control functions for communications platforms. For example, a gateway facility can enable one communications system to exchange messages with one or more different systems (not shown).

Control center 150 is used to send and receive data to and from communications platforms, such as those illustrated by communications platforms 122, 124, 126, and 128. Received data could be, for example, telemetry and/or location data, which enables control center to monitor the state of the communications platform. Control center 150 can also send command and control information to communications platforms via control link 155.

Figure 2:
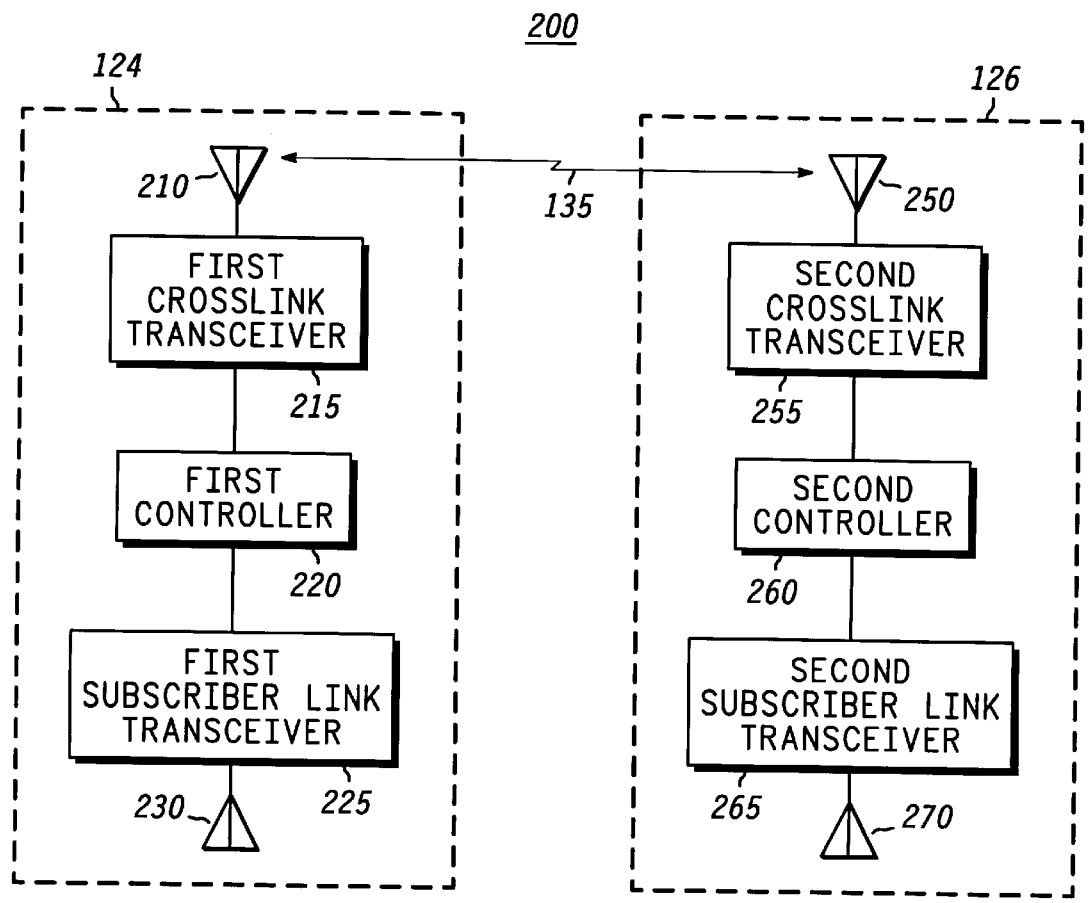
FIG. 2 illustrates a simplified block diagram of a time division duplex (TDD) platform pair in accordance with a preferred embodiment of the invention.

FIG. 2 illustrates a simplified block diagram of a TDD platform pair in accordance with a preferred embodiment of the invention. Preferably, many or all TDD platform pairs 130 (FIG. 1) within system 100 (FIG. 1) comprise equipment as illustrated by the simplified block diagram of a TDD platform pair 200 as illustrated in FIG. 2.

TDD platform pair 200 comprises first communications platform 124 which further comprises: first crosslink antenna 210, first crosslink transceiver 215, first controller 220, first subscriber link transceiver 225, and first subscriber link antenna 230. TDD platform pair 200 also comprises second communications platform 126 which further comprises: second crosslink antenna 250, second crosslink transceiver 255, second controller 260, second subscriber link transceiver 265, and second subscriber link antenna 270.

In addition, TDD platform pair 200 comprises crosslink 135 that is used to couple first communications platform 124 to second communications platform 126. In a preferred embodiment, a common clock is distributed to both communications platforms, and the common clock is used to synchronize transmit and receive operations on both communications platforms. In a preferred embodiment, the common clock is derived from a global positioning satellite (GPS) system.

First crosslink antenna 210 is coupled to first crosslink transceiver 215. First subscriber link antenna 230 is coupled to first subscriber link transceiver 225. In a preferred embodiment, first subscriber link antenna 230 comprises at least one phased array. First controller 220 is coupled to first crosslink transceiver 215 and to first subscriber link transceiver 225.

Second crosslink antenna 250 is coupled to second crosslink transceiver 255. Second subscriber link antenna 270 is coupled to second subscriber link transceiver 265. In a preferred embodiment, second subscriber link antenna 270 comprises at least one phased array. Second controller 260 is coupled to second crosslink transceiver 255 and to second subscriber link transceiver 265.

First controller 220 and second controller 260 could be implemented using one or more processors. First controller 220 and second controller 260 monitor and maintain, among other things, knowledge of a synchronized system time. Knowledge of a synchronized system time allows communications platforms in the TDD platform pair to determine when transmit times occur, and when receive times occur. In addition, knowledge of the synchronized system time allows TDD platform pairs to determine when links are being established, when links are being discontinued, and when hand-offs are occurring.

First controller 220 and second controller 260 could comprise memory device (not shown) to store data that serve as instructions to first controller 220 and second controller 260 and that, when executed by first controller 220 and second controller 260, cause TDD platform pair 200 to carry out particular aspects of the method of the invention, as will be discussed in detail below. In addition, memory device desirably includes variables, tables, and databases that are manipulated during the operation of TDD platform pair 200.

In a preferred embodiment, first controller 220 and second controller 260 control the formation of links, such as those illustrated by 112, 114, 116, and 118 (FIG. 1), by, among other things, determining link parameters, determining communications platform positioning, and determining TDDSU positioning. First controller 220 and second controller 260 determine, among other things, when to establish, terminate, and hand-off links. In addition, first controller 220 and second controller 260 determine which frames to use to transmit signals, which frames to use to receive signals, and which frequencies to use in each frame.

Desirably, TDD platform pair 200 can receive data packets and transmit data packets via any one of transceivers 215, 225, 255, and 265. In a preferred embodiment, transceivers 225 and 265 use the TDD technique.

For clarity and ease of understanding, FIG. 2 illustrates one first crosslink antenna 210, one first crosslink transceiver 215, one first controller 220, one first subscriber link transceiver 225, one first subscriber link antenna 230, one second crosslink antenna 250, one second crosslink transceiver 255, one second controller 260, one second subscriber link transceiver 265, and one second subscriber link antenna 270. In alternate embodiments, any number of these components could be used. The number of crosslink antennas 210 and 250 and associated transceivers, for example, depends on the number of crosslinks which are to be provided. For example, crosslinks can be established between TDD platform pairs, and crosslinks can be established between communications platforms within a TDD platform pair and at least one other platform during hand-off procedures.

In other alternate embodiments, crosslinks can be established between communications platforms in platform pairs using terrestrial-based stations, such as gateways. For example, communications platforms in inclined orbits can be traveling in opposite directions relative to each other, and this can cause platform-to-platform crosslink problems.

In alternate embodiments, first communications platform 124 also comprises a control link antenna and control link transceiver that is coupled to the control link antenna and to first controller 220. In other embodiments, second communications platform 126 also comprises a control link antenna and control link transceiver that is coupled to the control link antenna and to second controller 260. In these embodiments, at least one control link antenna and at least one control link transceiver support links 155 (FIG. 1) with at least one control center 150 (FIG. 1).

Preferably, each TDD platform pair 200 can simultaneously support a number of links with other TDD platform pairs 200, a number of links with other platforms, and many user terminal links with other communications devices, such as TDDSUs 110. During a particular frame, TDD platform pair 200 supports many user terminal links by using a number of assigned sub-frames to transmit and receive signals.

In a preferred embodiment, a combination FDMA/TDD format used to support communications between TDDSU 110 and at least one TDD platform pair. Spectrum, which is allocated to system 100 for its communication channels, is divided into a number of channels having different center frequencies. System time is synchronized within system 100. Time is divided into sequentially occurring frames, and frames are further subdivided into sub-frames.

Frames within the first communications platform are synchronized with frames within the second communications platform within a TDD platform pair. The timing of the sub-frames is defined relative to the timing of a frame. Of course, those skilled in the art will appreciate that any number of sub-frames can be included in a frame.

In a preferred embodiment, a "blinker mode" is used to mitigate the spectral capacity impact of the TDD technique. This mode uses a dual coverage scheme to compensate for the spectral capacity loss. This mode also requires that the dual coverage be provided by communications platforms in a TDD platform pair that are synchronized to each other using a common clock. The blinker mode uses a TDD platform pair as a single FDMA platform. In other words, during a particular frame one communications platform in the TDD platform pair is transmitting while the other communications platform is receiving.

In a preferred embodiment, the frame timing within a communications platform is fixed. That is, a communications platform has a limited ability to compensate for timing errors, which might occur in the signals, received by the communications platform. In addition, the time at which signals are transmitted by a communications platform is also fixed. Each frame is established to be either a transmit frame or a receive frame. Frames, for example, can be counted using various methods. In a preferred embodiment, first communications platform uses odd-number frames as transmit frames and uses even-numbered frames as receive frames. The second communications platform uses a complimentary frame assignment. That is, second communications platform uses odd-number frames as receive frames and uses even-numbered frames as transmit frames.

In a preferred embodiment, a guard time is used between transmit and receive operations on the communications platforms. This guard band is determined by, among other things, the difference between the maximum and minimum instantaneous differential delayed time of arrival (DDTOA) that can exist at the same instant of time between the two cooperating communications platforms in the TDD platform pair.

The number of sub-frames within an odd-numbered frame does not have to be equal to the number of sub-frames within an even-numbered frame. The duration of sub-frames within an odd-numbered frame need not equal the duration of sub-frames within an even-numbered frame. A frame can additionally include sub-frames, which are allocated to other purposes, such as routing or frame management.

In a preferred embodiment, a single channel frequency is used during a particular frame. In alternate embodiments, multiple channel frequencies can be used during a particular frame. For example, a TDD platform pair can transmit data to more than one TDDSU during a particular frame. The frequency assignments can change from sub-frame to sub-frame. In a preferred embodiment, the framing and management of the electromagnetic spectrum is desirably controlled by one or more-control centers 150 (FIG. 1).

Figure 3:
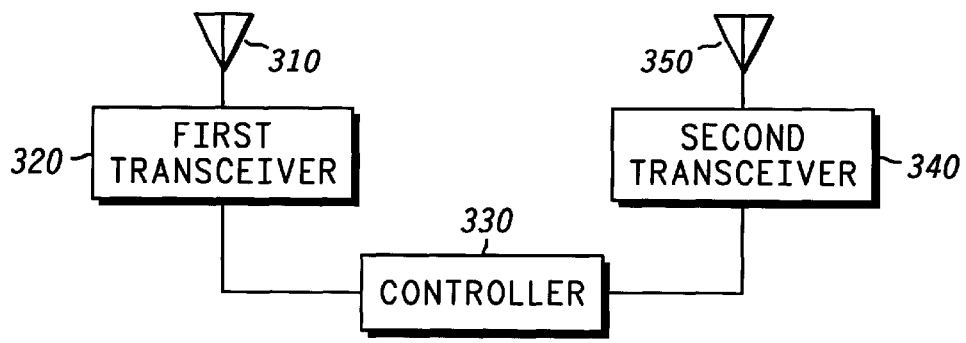
FIG. 3 shows a simplified block diagram of a Time Division Duplex subscriber unit (TDDSU) in accordance with a preferred embodiment of the invention.

FIG. 3 shows a simplified block diagram of a Time Division Duplex subscriber unit (TDDSU) in accordance with a preferred embodiment of the invention. TDDSU 110 receives and processes signals from two different sources, which are preferably communications platforms. TDDSU 110 processes and transmits signals to at least two different receiving devices, which are preferably communications platforms. In a preferred embodiment, TDDSU 110 comprises first antenna 310, first transceiver 320, controller 330, second transceiver 340, and second antenna 350. Controller 330 is coupled to first transceiver 320 and second transceiver 340.

First antenna 310 is coupled to first transceiver 320, and second antenna 350 is coupled to second transceiver 340. First antennas 310 and second antenna 350 are for transmitting and receiving data messages to and from the two different communications platforms within a TDD platform pair. Of course, those skilled in the art will appreciate that first antennas 310 and second antenna 350 can be implemented either as single multi-directional antennas, as a number of discrete antennas or array antennas.

First transceiver 320 and second transceiver 340 are for processing the signals that are used to convey the data messages to and from the two different communications platforms. Although only two transceivers 320 and 340 are shown in FIG. 3, multiple transceivers may be necessary since the subscriber unit supports more than two channels. Those skilled in the art will recognize that multi-channel transceivers can be used. Data messages transmitted and received by TDDSU 110 are described in more detail below.

Controller 330 can be implemented using one or more processors. In a preferred embodiment, controller 330, among other things, controls the frequency and timing parameters upon which first transceiver 320 and second transceiver 340 operate. Controller 330 can also include a number of memory elements (not shown). Memory elements store data that serve as instructions for controller 330 and that, when executed by 330, cause TDDSU 110 to carry out procedures which are discussed below. In addition, memory elements may store variables, tables, and databases that are manipulated during the operation of TDDSU 110. In a preferred embodiment, memory elements contain data buffers for storing blocks of data from individual frames.

In a preferred embodiment, controller 330 processes received data and processes transmitted data in accordance with the invention. Controller 330 maintains, among other things, system timing that determines which frames are used by the two different RF transceivers. In addition, controller 330 generally controls and manages user access.

In a preferred embodiment, first transceiver 320 and second transceiver 340 are multi-channel FDMA/TDD transceivers capable of transmitting and receiving on at least two different selectable frequencies during a particular selectable frame as directed by controller 330. First transceiver 320 and second transceiver 340 contain multi-channel radios having sufficient number of channels to provide the desired number of transmission and reception frequencies for operating with at least two different communications platforms.

First transceiver 320 and second transceiver 340 desirably operate using acquisition channels and traffic channels. Acquisition channels are primarily used during access protocols when a TDDSU desires access to communication system 100 or when a hand-off is necessary. Traffic channels are used for data exchange after access has been obtained or a hand-off is made. Traffic channels are two-way channels that are assigned to particular TDDSUs 110 by communications system 100 during certain frames.

Communication system 100 also comprises a plurality of TDDSUs 110. TDDSUs 110 are preferably user terminals, which are capable of receiving voice and/or data from at least one TDD platform pair 200 (FIG. 2) simultaneously during a single frame. By way of example, TDDSUs 110 may be hand-held, mobile satellite cellular telephones adapted to transmit to and receive transmissions from two different communications platforms. In addition, by way of example, TDDSUs 110 may be paging devices adapted to transmit to and receive transmissions from two different communications platforms.

The present invention is applicable to any communication system that provides dual coverage regions on the earth. In some embodiments, these dual coverage regions move across the surface of the earth. A TDDSU is located in a dual coverage region that is covered by beams from at least two communications platforms. In addition, TDDSU receives and processes signals from at least two RF channels.

When the TDDSU is in an area where only one communications platform is providing coverage, then the TDDSU can transmit to a single communications platform using a half-rate technique. In a preferred embodiment, a single half-rate link is used to maintain a communications channel when a full-rate link cannot be established. Desirably, a half-rate link with a single platform is approximately half as efficient as a full-rate link with a platform pair.

In a preferred embodiment, soft hand-off conditions are inherent in the system because, among other things, half-rate links can be used. For example, if a full-rate link is dropped during a platform to platform hand-off, a half-rate link can be used to maintain a communications channel. In addition, half-rate links allow blocking problems, among other things, to be overcome. Half-rate links also allow service to be provided in areas where only one communications platform is operational at a particular time.

Dual coverage areas are provided in which coverage is provided to a TDDSU by two different communications platforms located at different locations. The TDDSU located in the dual coverage area receives signals from one platform in the TDD platform pair during at least one sub-frame in a frame, and it transmits signals to the other platform in the TDD platform pair during at least one other sub-frame in a frame.

When communications platforms move relative to a TDDSU, new dual coverage regions are established for the TDDSU. The TDDSU moves from one dual coverage area to another by establishing links with a new communications platform. The TDDSU does a soft hand-off by switching from one communications platform to another without losing contact with the communication system.

Figure 4:
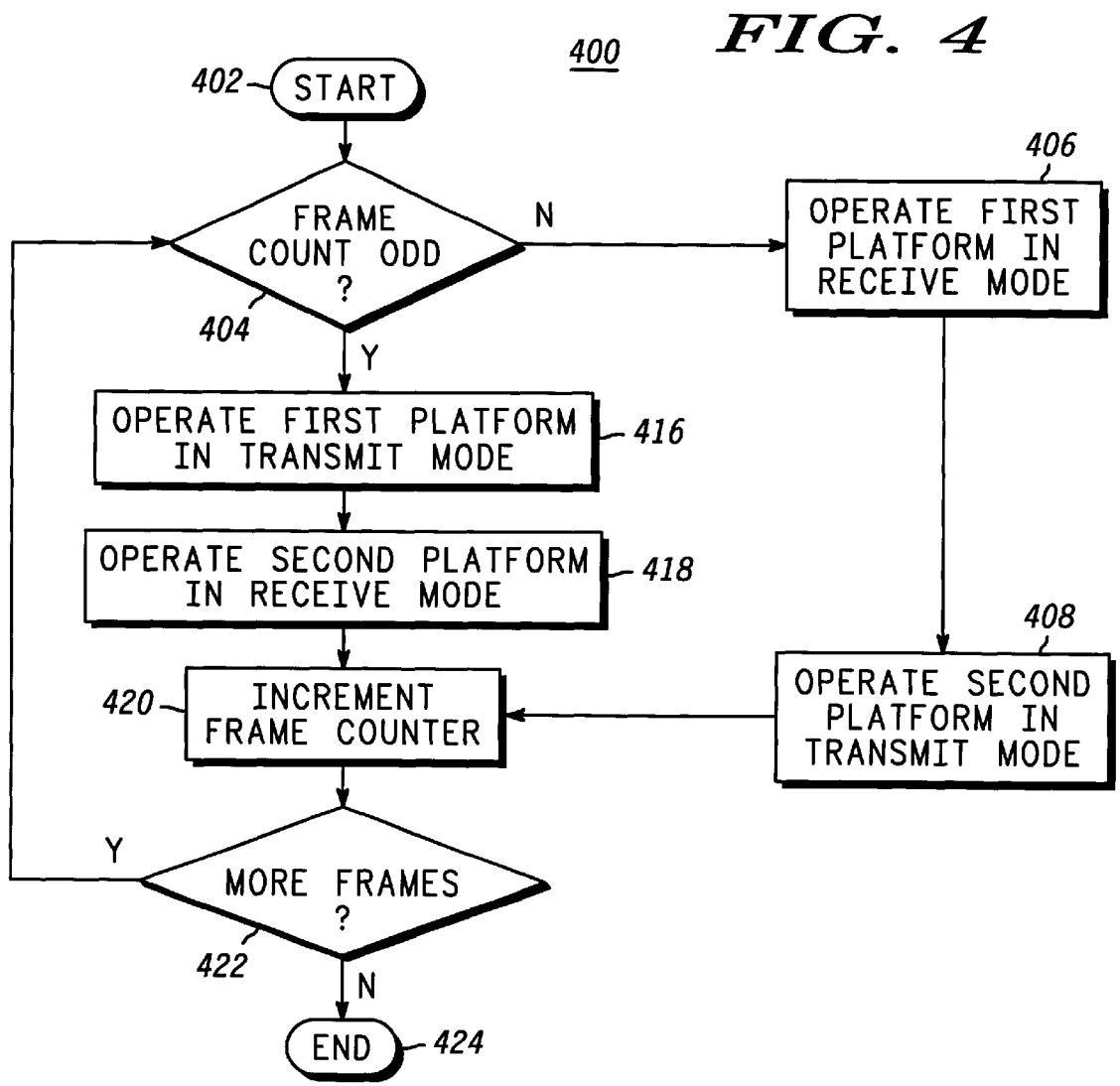
FIG. 4 illustrates a flowchart for operating a TDD platform pair in accordance with a preferred embodiment of the invention.

FIG. 4 illustrates a flowchart for operating a TDD platform pair in accordance with a preferred embodiment of the invention. Procedure starts in step 402. For example, step 402 could be the result of a command from a control center within the system. In step 402, counters, such as a frame count counter, can be initialized.

In step 404, a query is performed to determine if the current frame count is odd or even. When the frame count is even, then procedure 400 branches to step 406, and procedure 400 continues as shown in FIG. 4. When the frame count is odd, then procedure 400 branches to step 416, and procedure 400 continues as shown in FIG. 4.

In step 406, the first communications platform is operated in the receive mode during this even-numbered frame. An even-numbered frame comprises a number of sub-frames. The first communications platform can receive during any number of sub-frames. The first communications platform can also receive on a number of different frequencies during an even-numbered frame. A different receive frequency can be associated with each sub-frame.

In a preferred embodiment, a first communications platform receives using the same frequency for an entire even-numbered frame. In this embodiment, an even-numbered frame comprises four sub-frames.

In step 408, the second communications platform in the TDD platform pair is operated in the transmit mode during this even-numbered frame. The second communications platform can transmit during any number of sub-frames in an even-numbered frame. The second communications platform can also transmit on a number of different frequencies during an even-numbered frame. A different transmit frequency can be associated with each sub-frame.

In a preferred embodiment, a second communications platform transmits using the same frequency for an entire even-numbered frame. Procedure 400 continues with step 420.

In step 416, the first communications platform in the TDD platform pair is operated in the transmit mode during this odd-numbered frame. An odd-numbered frame comprises a number of sub-frames. The first communications platform can transmit during any number of sub-frames. The first communications platform can also transmit on a number of different frequencies during an odd-numbered frame. A different transmit frequency can be associated with each sub-frame.

In alternate embodiments, the time duration for an odd-numbered frame can be different from the time duration for an even-numbered frame. The time duration for a sub-frame in an odd-numbered frame can be different from the time duration for a sub-frame in an even-numbered frame. The number of sub-frames in an even-numbered frame can be different from the number of sub-frames in an odd-numbered frame.

In a preferred embodiment, a first communications platform transmits using the same frequency for an entire odd-numbered frame. In this embodiment, an odd-numbered frame comprises four sub-frames.

In step 418, the second communications platform in the TDD platform pair is operated in the receive mode during this odd-numbered frame. The second communications platform can receive during any number of sub-frames in an odd-numbered frame. The second communications platform can also receive on a number of different frequencies during an odd-numbered frame. A different receive frequency can be associated with each sub-frame.

In a preferred embodiment, a second communications platform receives using the same frequency for an entire odd-numbered frame. Procedure 400 continues with step 420.

In step 420, the frame counter is incremented.

In step 422, a query is performed to determine if more frames are required. When more frames are required, then procedure 400 branches to step 404 and iterates as shown in FIG. 4. When more frames are not required, then procedure 400 branches to step 424 and ends.

Figure 5:
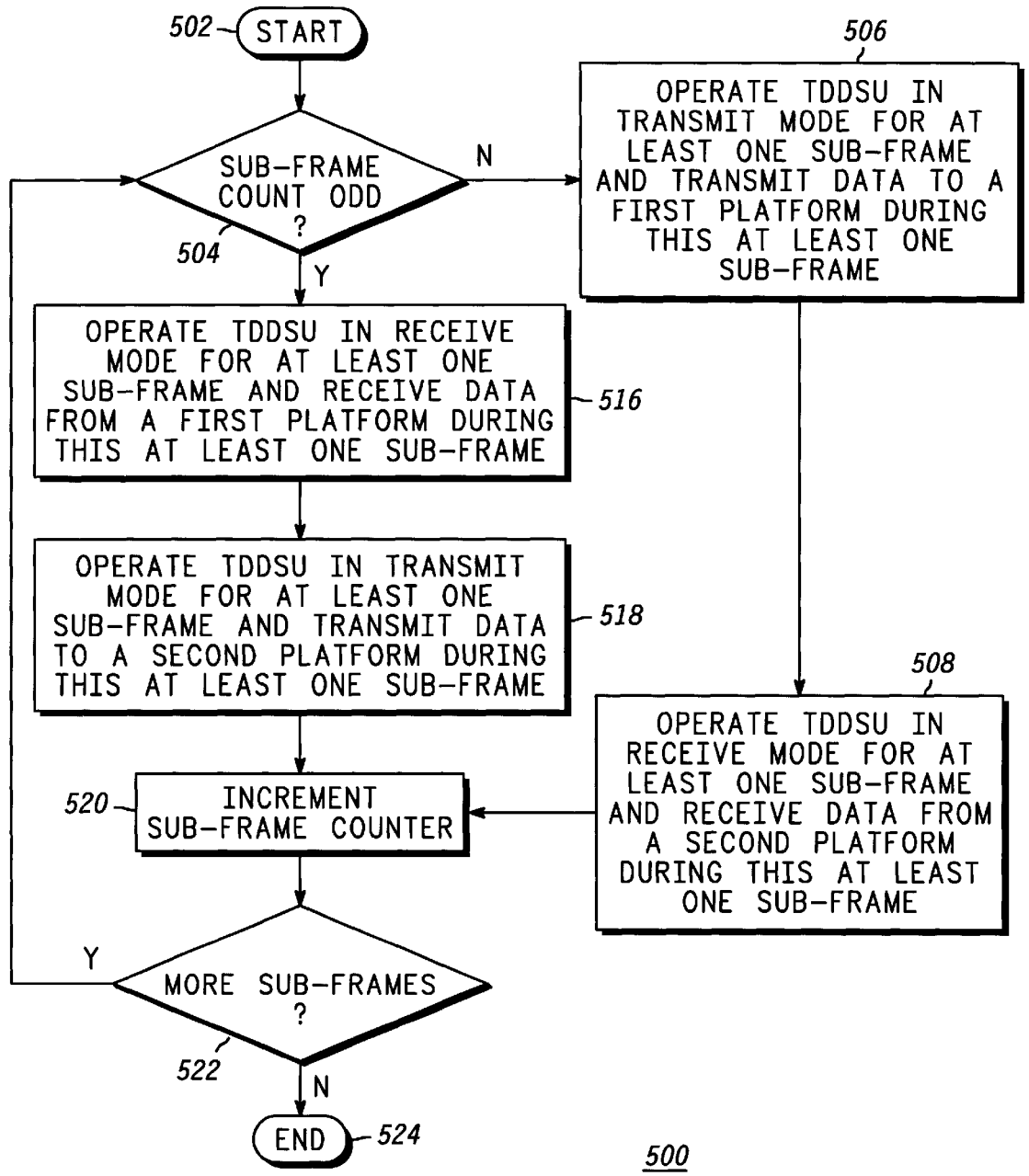
FIG. 5 illustrates a flowchart of a method for operating a time division duplex subscriber unit (TDDSU) in accordance with a preferred embodiment of the invention.

FIG. 5 illustrates a flowchart of a method for operating a time division duplex subscriber unit (TDDSU) in accordance with a preferred embodiment of the invention. Procedure 500 starts in step 502. Step 502, for example, could be the result of a user attempting to make a call to another user. TDDSU must determine where to send the data, when to send the data, and how to send the data.

In step 504, a query is performed to determine the current sub-frame count and if the current frame count is odd or even. In a preferred embodiment, TDDSU uses an internal frame counter to determine which frame is currently being used. In alternate embodiments, TDDSU can obtain frame count information from the system. For example, frame count information could be sent by a communications platform. When the frame count is even, then procedure 500 branches to step 506, and procedure 500 continues as shown in FIG. 5. When the frame count is odd, then procedure 500 branches to step 516, and procedure 500 continues as shown in FIG. 5.

In step 506, a TDDSU is operated in the transmit mode during at least one sub-frame within this even-numbered frame. An even-numbered frame comprises a number of sub-frames. A different TDDSU can use each sub-frame in an even-numbered frame to transmit data to a first communications platform in a TDD platform pair. In a preferred embodiment, a TDDSU establishes a first link with the first communications platform and transmits second data to the first communications platform in a TDD platform pair during the first sub-frame in an even-numbered frame.

In step 508, a TDDSU is operated in the receive mode during at least one sub-frame within this even-numbered frame. An even-numbered frame comprises a number of sub-frames. A different TDDSU can use each sub-frame in an even-numbered frame to receive data from a second communications platform in a TDD platform pair. In a preferred embodiment, a TDDSU establishes a second link with the second communications platform and receives fourth data from the second communications platform in the TDD platform pair during the second sub-frame in an even-numbered frame. Procedure 500 continues with step 520.

In step 516, a TDDSU is operated in the receive mode during at least one sub-frame within an odd-numbered frame. An odd-numbered frame comprises a number of sub-frames. A different TDDSU can use each sub-frame in an odd-numbered frame to receive data from a first communications platform in a TDD platform pair. In a preferred embodiment, a TDDSU establishes a first link with the first communications platform and receives first data from the first communications platform in a TDD platform pair during the second sub-frame in an odd-numbered frame.

In step 518, a TDDSU is operated in the transmit mode during at least one sub-frame within this odd-numbered frame. An odd-numbered frame comprises a number of sub-frames. A different TDDSU can use each sub-frame in an odd-numbered frame to transmit data to a second communications platform in a TDD platform pair. In a preferred embodiment, a TDDSU establishes a second link with the second communications platform and transmits third data from the second communications platform in the TDD platform pair during the first sub-frame in an odd-numbered frame. Procedure 500 continues with step 520.

In step 520, a sub-frame counter and a frame counter are updated and incremented as required.

In step 522, a query is performed to determine if more frames and/or sub-frames are required. When additional frames or sub-frames are required, then procedure 500 branches back to step 504, and procedure 500 iterates as shown in FIG. 5. When additional frames or sub-frames are not required, then procedure 500 branches to step 524, and procedure 500 ends.

In a preferred embodiment, a TDDSU establishes and maintains links with at least two communications platforms, which are spatially separated. In addition, the two communications platforms operate as a TDD platform pair. The two communications platforms are also separated in time, this means that they both do not transmit at the same time. This also means they do not receive at the same time. In addition, the communications platforms have a limited ability to overcome delay problems. That is, they are expecting received data packets at particular time. The TDDSUs must adjust their transmit and receive schedules to accommodate the schedules on the communications platforms with which they have established links. The TDDSU corrects for the delayed time of arrival (DTOA) and Doppler for each link it has currently established with a communications platform. The TDDSU also determines when the communications platform expects to receive the data so it determines the time to transmit based on the expected time of arrival and the current delay. The TDDSU maintains two links, and it can receive and transmit on the two links simultaneously. In alternate embodiments, a TDDSU maintains two links, but it does not receive and transmit on the two links simultaneously.

In alternate embodiments, TDDSUs can operate in a full duplex mode. This allows a longer burst time, that improves the link margin, but this requires filtering that reduces the link improvement and spectral efficiency. Although filtering is used to some extent in the TDDSU, filtering is desirably eliminated in the communications platforms. Filtering is avoided by requiring the reception of the downlink data during one sub-frame and the transmission of uplink data during a different sub-frame for each link.

In a preferred embodiment, DTOA and DDTOA are determined by the TDDSU. As the DTOA increases the TDDSU must transmit earlier and receive later. As the DTOA increases, the TDDSU receive sub-frame and transmit sub-frame slide in opposite directions on the time axis. Even if the sub-frame length shrinks to zero, a minimum frame length must be accommodated. In a preferred embodiment, the frame size is used to establish the maximum DTOA. In this embodiment, the maximum DTOA is one frame. For a TDDSU, the minimum frame length is $$Tf = 4*(Tb + \text{Max}DTOA) + 2*DDTOA$$

where Tb is the sub-frame (burst) time, MaxDTOA is the maximum DTOA, and DDTOA is the differential DTOA or difference between the maximum and minimum DTOA.

Desirably, to maximize the link margin, the sub-frame time should be as long as possible. For example, a guard time is required because the DTOA is different because different communications platforms are being used. Typically, the sub-frame rate is increased to compensate for the shorter time available for each sub-frame because of the guard time, and this requires additional transmit power or larger antenna. The full guard time is needed when one communications platform is at it maximum DTOA and the other communications platform is at its minimum DTOA. For example, this can occur when the communications platforms are satellites. The partial overlap of TDDSU frames does not create an interference problem as long as the overlap is less than or equal to the minimum DTOA. That is the guard band can be equal to DDTOA rather than the maximum DTOA.

In establishing the TDD technique as an effective global technique, a wide area of the earth is provided with dual coverage. This means in a global communications system that a TDDSU must see at least two communications platforms wherever it is located on the earth. This mode employs a frame structure that allows the TDDSU to transmit to both communications platforms in a frame time. In other words, when one communications platform is transmitting the other communications platform is receiving and vice versa.

When routing is considered the improvement gained by the blinking mode is impacted somewhat. This is driven by the fact that the TDDSU or gateway has to reconstruct the entire packet sequence in order. To do this the TDDSU has to wait for the sub-frame with the longest delay and since the blinking mode routes sub-frame in a frame independently, the average time the TDDSU needs to wait also increases. For example, in a normally distributed delay distribution the sub-frame is routed faster than the average half the time. Every time the TDDSU has to wait for the slowest packet then the delay is longer.

Spatial diversity is an inherent property of a blinking mode system. In the spatial diversity mode, the same TDDSU packet is sent to the two different communications platforms during a single frame. Under severe fading conditions, this allows the TDDSU or gateway to select the packet with the best performance. However, end to end delay is impacted because the TDDSU effectively only transmits once per frame. Under these conditions, the subscriber links contribution to the end to end delay is doubled.

In another embodiment, a TDDSU receives the first data during a first time segment using a first channel, operating on a first link between the TDDSU and a first communications platform, transmits second data during a second time segment using the first channel, operating on the first link between the TDDSU and the first communications platform, transmits the third data during a third time interval using a second channel, operating on the second link between the TDDSU and the second communications platform, and receives the fourth data during a fourth time interval using the second channel, operating on the second link between the TDDSU and the second communications platform.

In another embodiment, the communications system is managed using frames and sub-frames for data transmission. The system comprises a plurality of first platforms, wherein a first platform transmits a first number of transmit sub-frames during odd-numbered frames and receives a second number of receive sub-frames during even-numbered frames. The system further comprises a plurality of second platforms, wherein a second platform receives said first number of receive sub-frames during odd-numbered frames and transmits said second number of transmit sub-frames during even-numbered frames. The plurality of second platforms is coupled to the plurality of first platforms forming a plurality of TDD platform pairs. In addition, the system comprises a plurality of TDDSUs, wherein at least one of said plurality of TDDSUs receives at least one of said first number of transmit sub-frames during a first time segment, transmits at least one of said first number of receive sub-frames during a second time segment, receives at least one of said second number of transmit sub-frames during a third time segment, and transmits at least one of said second number of receive sub-frames during a fourth time segment.

In summary, a communications system which uses a time division duplex frame structure has been described. The invention has been described above with reference to a preferred embodiment. However, those skilled in the art will recognize that changes and modifications can be made in this preferred embodiment without departing from the scope of the invention. For example, the block diagram and steps identified herein can be categorized and organized differently than described herein while achieving equivalent results. In addition, the number of sub-frames within a frame, the number of frames could be different from that described in the preferred embodiment. Further, although two overlapping coverage regions have been described any number of overlapping coverage regions and any number of communications platforms can be used. These and other changes and modifications that are obvious to those skilled in the art are intended to be included within the scope of the invention.

What is claimed is:

1. A communications system comprising:

a plurality of time division duplex (TDD) platform pairs, each TDD platform pair comprising a first communications platform and a second communications platform being coupled to said first communications platform, said first communications platform transmitting first data during a first frame, receiving second data during a second frame, said second communications platform receiving third data during said first frame, transmitting fourth data during said second frame; and a plurality of time division duplex subscriber units (TDDSUs), each TDDSU establishing a first link with said first communications platform, establishing a second link with said second communications platform, receiving said first data from said first communications platform using said first link during said first frame, transmitting said third data to said second communications platform using said second link during said first frame, transmitting said second data to said first communications platform using said first link during said second frame, receiving said fourth data from said second communications platform using said second link during said second frame.

2. The communications system as claimed in claim 1, wherein said first communications platform comprises a first coverage area, said second communications platform comprises a second coverage area, said second coverage area overlapping said first coverage area forming a dual-coverage area, and at least one TDDSU being located within said dual-coverage area.

3. The communications system as claimed in claim 1, wherein said first communications platform transmits said first data during a second sub-frame in said first frame, receives said second data during a first sub-frame in said second frame.

4. The communications system as claimed in claim 3, wherein said second communications platform receives said third data during a first sub-frame in said first frame, transmits said fourth data during a second sub-frame in said second frame.

5. The communications system as claimed in claim 3, wherein said TDDSU receives said first data during a sub-frame in said first frame, transmits said third data during another sub-frame in said first frame, transmits said second data during a sub-frame in said second frame, and receives said fourth data during another sub-frame in said second frame.

6. The communications system as claimed in claim 3, wherein said first frame comprises a plurality of sub-frames and said second frame comprises a plurality of sub-frames.

7. The communications system as claimed in claim 3, wherein said first frame comprises a plurality of sub-frames and said second frame comprises a plurality of sub-frames.

8. The communications system as claimed in claim 3, wherein said first frame comprises at least one guard time.

9. The communications system as claimed in claim 3, wherein said second frame comprises at least one guard time.

10. The communications system as claimed in claim 3, wherein said first frame and said second frame are separated in time by at least one guard time.

11. The communications system as claimed in claim 3, wherein said first link comprises a first delayed time of arrival (DTOA) and said second link comprises a second DTOA.

12. The communications system as claimed in claim 11, wherein said TDDSU determines said first DTOA and said second DTOA.

13. The communications system as claimed in claim 11, wherein said TDDSU uses said first DTOA to determine when to transmit said second data and uses said second DTOA to determine when to transmit said second data.

14. The communications system as claimed in claim 11, wherein said TDDSU uses said first DTOA to determine when to receive said first data and uses said second DTOA to determine when to transmit said fourth data.

15. The communications system as claimed in claim 1, wherein said first communications platform is a geosynchronous (GEO) satellite and said second communications platform is a second GEO satellite.

16. The communications system as claimed in claim 1, wherein said first communications platform is a non-geosynchronous (Non-GEO) satellite and said second communications platform is a second Non-GEO satellite.

17. The communications system as claimed in claim 1, wherein said first communications platform and said second communications platform comprise a common clock and use said common clock to determine when said first frame and said second frame begin and end.

18. The communications system as claimed in claim 1, wherein said TDD platform pair further comprises a third communications platform being coupled to said second communications platform, wherein said third communications platform transmits fifth data during a frame, receives sixth data during another frame using a third link with said TDDSU, said third link being used during hand-off from one platform to another.

19. A plurality of time division duplex (TDD) platform pairs for use in a communications system which uses a TDD frame structure, each TDD platform pair comprising:

a first communications platform;

a second communications platform being coupled to said first communications platform, said first communications platform transmitting first data during a first frame, receiving second data during a second frame, said second communications platform receiving third data during said first frame, transmitting fourth data during said second frame;

said first communications platform further comprises:
  a first crosslink antenna,
  a first crosslink transceiver coupled to said first crosslink antenna,
  a first subscriber link antenna,
  a first subscriber link transceiver coupled to said first subscriber link antenna, and
  a first controller coupled to said first crosslink transceiver and coupled to said first subscriber link transceiver; and said second communications platform further comprises:
  a second crosslink antenna,
  a second crosslink transceiver coupled to said second crosslink antenna,
  a second subscriber link antenna,
  a second subscriber link transceiver coupled to said second subscriber link antenna, and
  a second controller coupled to said second crosslink transceiver and coupled to said second subscriber link transceiver, said first communications platform being coupled to said second communications platform using a crosslink established between said first crosslink antenna and said second crosslink antenna; and
  said first subscriber link transceiver transmits said first data during a second sub-frame in said first frame and said second subscriber link transceiver receives said second data during a first sub-frame in said second frame.

20. The TDD platform pair as claimed in claim 19, wherein said first subscriber link antenna establishes a first coverage area, said second subscriber link antenna establishes a second coverage area, said second coverage area overlapping said first coverage area forming a dual-coverage area.

21. The TDD platform pair as claimed in claim 19, wherein said first subscriber link transceiver receives said third data during a first sub-frame in said first frame and said second subscriber link transceiver transmits said fourth data during a second sub-frame in said second frame.

22. A method of operating a time division duplex (TDD) platform pair, the method comprising the steps of:

a) determining if a current frame has a count that is an odd number or an even number;

b) when said count is said odd number, operating a first communications platform in a transmit mode during said current frame;

c) when said count is said odd number, operating a second communications platform in a receive mode during said current frame;

d) when said count is said even number, operating said first communications platform in said receive mode during said current frame; and e) when said count is said odd number, operating said second communications platform in said transmit mode during said current frame.

23. The method of operating a TDD platform pair as claimed in claim 22, wherein step b) further comprises the steps of:

b1) establishing a first subscriber link between said first communications platform and a first TDDSU using a first frequency;

b2) transmitting first data during a first frame; and b3) receiving second data during a second frame.

24. The method of operating a TDD platform pair as claimed in claim 22, wherein step c) further comprises the steps of:

c1) establishing a second subscriber link between said second communications platform and a first TDDSU using a first frequency;

c2) transmitting third data during a first frame; and c3) receiving fourth data during a second frame.

25. A method of operating a time division duplex subscriber unit (TDDSU), the method comprising the steps of:

a) establishing a first link with a first communications platform in a TDD platform pair;

b) establishing a second link with a second communications platform in said TDD platform pair;

c) receiving first data from said first communications platform using said first link during a first frame, said first frame being in a TDD frame structure established by said TDD platform pair;

d) transmitting third data to said second communications platform using said second link during said first frame;

e) transmitting second data to said first communications platform using said first link during a second frame, said second frame being in said TDD frame structure established by said TDD platform pair;

f) receiving fourth data from said second communications platform using said second link during said second frame; and g) processing said first data, said second data, said third data, and said fourth data.

26. The method of operating a TDDSU as claimed in claim 25, wherein step a) further comprises the steps of:

a1) operating said TDDSU in a transmit mode during a first number of sub-frames; and a2) operating said TDDSU in a receive mode during a second number of sub-frames.

* * * * *

UNITED STATES PATENT AND TRADEMARK OFFICE
CERTIFICATE OF CORRECTION

PATENT NO.    : 6,275,475 B1
DATED         : August 14, 2001
INVENTOR(S)   : Thomas Peter Emmons, Jr. and Robert Anthony Peters It is certified that error appears in the above-identified patent and that said Letters Patent is hereby corrected as shown below:

<u>Title page,</u>
Item [75], Inventors, should read as follows:

-- [75]  Inventors:  Thomas Peter Emmons, Jr., Mesa, AZ (US); Robert Anthony Peters, Silver Spring, MD (US) --

Signed and Sealed this

First Day of June, 2004

JON W. DUDAS
*Acting Director of the United States Patent and Trademark Office*